United States Patent Office 3,348,277
Patented Oct. 24, 1967

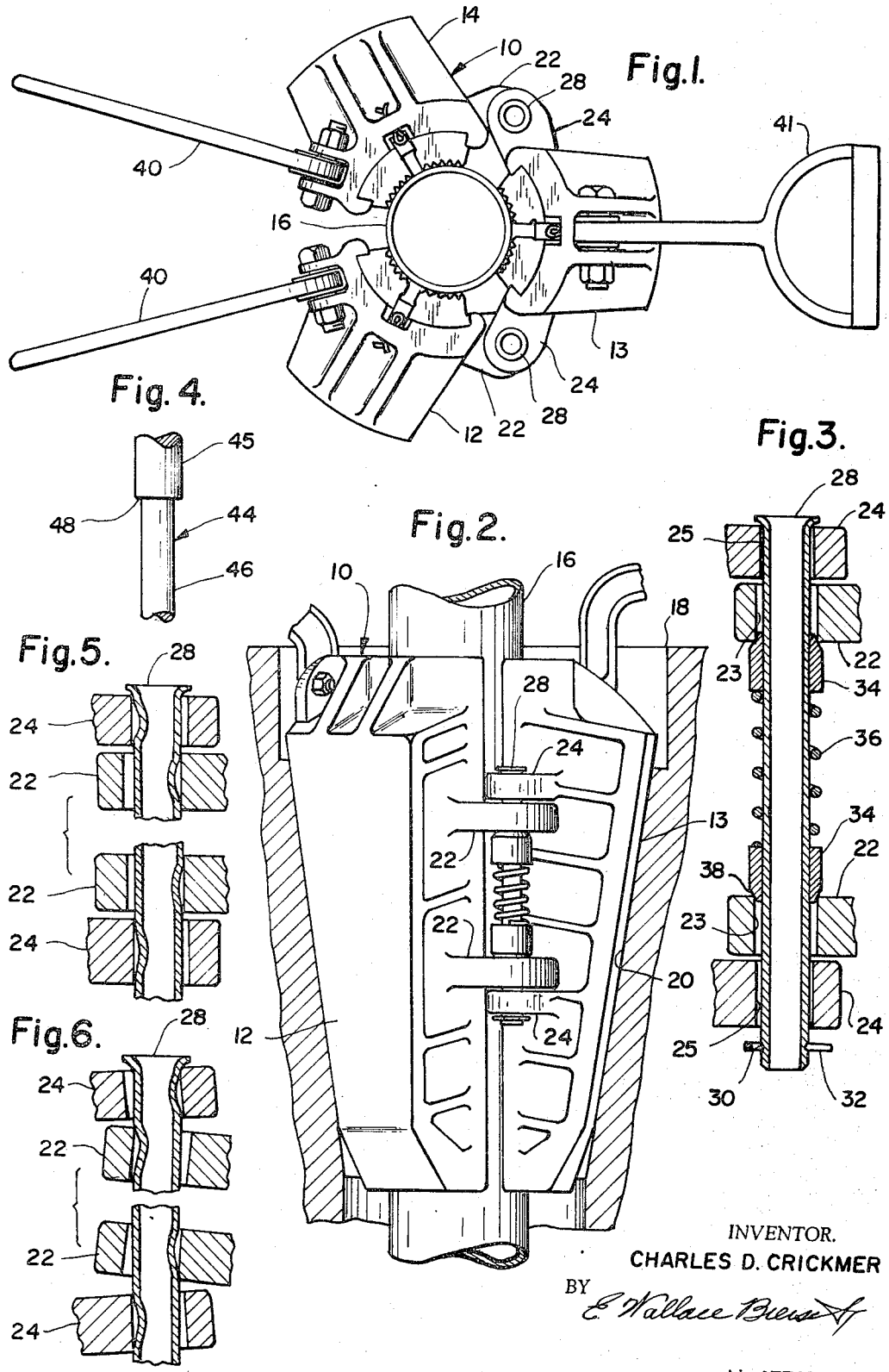

3,348,277
PIPE SLIP ASSEMBLY AND METHOD
FOR TESTING
Charles D. Crickmer, Houston, Tex., assignor to Joy Manufacturing Company, Pittsburgh, Pa., a corporation of Pennsylvania
Filed May 5, 1966, Ser. No. 547,953
11 Claims. (Cl. 24—263)

ABSTRACT OF THE DISCLOSURE

A pipe slip assembly and testing method wherein a hinge assembly for a multi-segment body pipe slip incorporates a hinge pin deformable under load as an indication of misalignment or mismatching of the pipe slip assembly with a supporting master bushing as a safety feature.

The pipe slip assembly of this invention is similar to that shown and illustrated in the United States Patent 2,924,866 (Johnson) which issued Feb. 16, 1960, and comprises a plurality of slip members hinged together to form a cylindrical, internal, pipe engaging, serrated surface and an external, inverted frusto-conical surface to be engaged in a bowl formed at the center of a master bushing of a rotary table forming part of a rotary drilling rig. When in use the pipe slip assembly has its inner surface engaged with the exterior of a pipe or casing with the exterior surface of the slip assembly seated in the master bushing bowl. Downward force on the slip assembly causes the slip members engaged by the master bushing bowl to move inwardly against the pipe by wedging action in a manner well known in the well drilling art.

As long as the master bushing bowl, the pipe slip assembly and the pipe are of the correct size and shape, as designed, the pipe will be firmly gripped and held against downward forces due to the weight of the pipe string without damage to the pipe even in the deepest wells. However, should the master bushing bowl, the pipe slips or the pipe be worn or of incorrect size inward motion of the slips may become uneven, angular or too great for the freedom of motion designed into them with the result that the pipe and/or slip assembly may be damaged. It is well recognized that the main factor in the damaging of pipes by slip engagement is due to worn or damaged slips and master bushings. Many users recognize the problem and danger of slip and master bushing wear and consequent mismatching but have no way of measuring these products in the field due to their complex geometry of tapers, radii, planes at different angles and because of the lack of accurate measuring tools.

The pipe slip assembly of this invention incorporates a hollow tubular hinge pin which serves the primary purpost of allowing the pipe slip assembly to be unitized for ease of handling and to be opened to encompass the pipe followed by closing of the assembly around the pipe and insertion into the master bushing bowl. Should the above described mismatching of any of the elements occur, excessive movement of the slip members will cause deformation of the tubular hinge pin without however, causing the hinge pin to fail. Such deformation can be visually observed or checked by the insertion of a gage piece such as a bar or rod of proper diameter into the tubular hinge pin so that even slight deformations can be detected and, if desired, measured. Thus, with the pipe slip assembly of this invention wear on the slips or in the master bushing bowl can be periodically checked by simple, readily used means, and when necessary, followed by timely repair or replacement of worn elements of the pipe gripping assembly.

The objects and advantages of this invention will be readily apparent from the following description and drawings in which:

FIG. 1 is a top plan view of a pipe slip assembly constructed according to the principles of this invention;

FIG. 2 is a side elevational view of the pipe slip assembly of FIG. 1;

FIG. 3 is a fragmentary sectional view of the hinge portion of the pipe slip assembly of FIG. 1;

FIG. 4 is a fragmentary view of a hinge pin gage rod;

FIG. 5 is an illustrative diagrammatic representation of a portion of the hinge assembly of FIG. 3 when mismatching has occurred;

FIG. 6 is a diagrammatic representation similar to FIG. 5 but illustrating different conditions of mismatching.

The pipe slip assembly of this invention as shown in FIGS. 1 and 2 and generally indicated at 10 comprises a plurality of slip members 12, 13 and 14 hinged together as shown in FIG. 1 to form a pipe engaging assembly with serrated inner surfaces engaging the outer surface of a pipe 16 in a manner well known in the art.

In FIG. 2 the pipe slip assembly 10 is shown to have outer surfaces forming portions of an inverted frusto-conical surface mating with a similar internal frusto-conical surface portion of a support means such as a master bushing bowl 20 formed in a master bushing 18, only a fragment of which is shown. Pairs of the slip members such as 12, 13 and 13, 14 are connected together through hinges comprising a pair of hinge lugs 22 extending from a surface of the hinge member 12 toward a facing surface of the adjacent hinge member 13, co-acting with a pair of hinge lugs 24 extending from the surface of hinge member 13 facing the hinge member 12. The hinge lugs 22 and 24 have suitable bores 23 and 25, respectively, extending therethrough which in the normal non-working position of the slip assembly 10 are coaxial.

As best seen in FIG. 3, the bores 23 in the lugs 22 are substantially larger than the bores 25 in the lugs 24 for a purpose to be described. Extending through each pair of lugs 24 and the respectively cooperating pair of lugs 22 is an elongated tubular pin member 28 having a flared head portion at one end larger than bore 25 and having, adjacent the other end, an external circumferential groove 30 for suitably receiving a retaining member such as a hairpin clip 32 suitably seated in the groove 30 to prevent the pin 28 from working out of the hinge during operation of the assembly. Another groove 30 and another clip 32 could be used in place of the head portion so that the pin 28 would be removable either upwardly or downwardly. Slidably received on the outer surface of the pin 28 is a pair of bevel washers 34 spaced apart and held in contact with the facing surfaces of the lugs 22 by a resilient member such as a cylindrical compression spring 36 resiliently engaged with the bevel washers 34 to hold them in engagement with the lugs 22. Each bevel washer 34 has a conical surface portion 38 engaged with the bore 23 to hold the pin 28 centered in the bores 23 until sufficient force tending to move the lugs 22 relative to the lugs 24 is applied to act upon the conical surfaces 38 and force the bevel washers 34 towards each other against the biasing of the spring 36, at which time the lugs 22 can move transversely relative to the pin 28 to accommodate misalignment of the bores 23 and 25 as will hereinafter appear.

It is to be noted that the use of the bevel washer 34 and the spring 36 in conjunction with the oversize bores 23 is a known expedient in the use of pipe slip assemblies and is not a necessary part of the instant invention.

In the slip assembly of this invention at least one of the pins 28 is typically of seamless steel tubing and in a particular embodiment has a ¾ quarter inch outside diameter with approximately ½ inch inside diameter and a length of approximately 8½ inches. The pin 28 is stiff enough to remain straight under reasonable loading but soft enough to be measurably deformed without breaking when excessive loading is applied and to retain such deformation when the excess stresses are removed. Any hollow pin having these characteristics can be used to apply the principles of this invention.

The operation of the pipe slip assembly 10 of this invention begins with the pipe 16, typically the uppermost member of a string of drill pipe or other pipe members suspended in an oil well, extending upwardly through the empty master bushing bowl 20 and centrally located therein. The pipe slip assembly 10 is picked up by means of handle members 40 on the slip members 12 and 14 and handle member 41 on the slip member 13 with the handle members 40 being spread apart to allow the slip members 12 and 14 to separate by somewhat more than the diameter of the pipe 16 so that the slip member 13 can be brought into contact with one side of the pipe 16, whereupon, the handle members 40 are moved toward each other so that the slip members 12, 13 and 14 surround the pipe 16 as shown in FIG. 1. The pipe slip assembly 10 is then lowered into the bowl 20 in the position shown in FIG. 2. Biasing of the handles 40 toward each other and lowering of the pipe 16 and the pipe slip assembly 10 into the bowl 20 with the slips being forced inwardly against the pipe 16 is accomplished in a manner well knows in the well drilling art. If the pipe 16, the master bushing bowl 20 and the pipe slip assembly 10 are of correct size and geometry and are properly aligned only a slight movement of the pin 28 in the bores 25 is necessary to bring the serrated inner surfaces of the slip members into weight bearing engagement with the pipe 16 to support the pipe against the downward pull of the pipe string.

Should the pipe 15 be somewhat smaller than that for which the slip assembly 10 was designed or if the inner serrated surfaces of the slip member are worn; the bowl is undersized or the bowl taper is wrong, greater inward motion of the slip members will be necessary to provide the weight bearing engagement and in that case the lugs 22 will be biased out of their alignment with the lugs 24 and the pin 28 will be forced to move transversely of the bores 23 accompanied by movement of the bevel washers 34 as hereinabove described.

In FIG. 4 there is shown a fragment of an elongated cylindrical gage rod 44 having a large diameter portion 45 and a smaller diameter portion 46 connected by a shoulder 48 as shown. The larger diameter 45 of the gage rod 44 is slightly smaller than the inside diameter of the pin 28 to allow the rod 44 to slide freely through the inside of the pin 28 if it has not been deformed while the smaller diameter 46 is of such size as to slide freely through the pin 28 until the permissible amount of deformation which the pin 28 can undergo without resulting damage to the pipe 16, the bowl 20 or the pipe slip assembly 10 has been exceeded.

After normal operation of the pipe slip assembly 10 as above described the gage rod 44 can be tried in the pin member 28 and will be found to slide freely through the pin 28 as far as may be desired. This shows that the pipe slip assembly 10, the pipe 16 and the master bushing bowl are of design size and geometry and properly used so that no permanent deformation of the pin 28 has taken place.

In case the pipe slip assembly 10 has been used on undersized or necked down pipe, trial with the gage rod 44 will reveal that the pin 28 has been deformed to such an extent that less than five percent of the length of gage rod 44 will be insertable in the pin 28 and upon closer examination the pin 28 will be found to be deformed in a manner characterized by the indentations nearest the groove 30 and nearest the head of pin 28 being on the same side of the pin as shown in FIG. 5 since the lugs 24 and 22 have been misaligned as a result of the squeezing action of the bowl 20 forcing the segments 12, 13 and 14 more closely together than the clearance of bores 23 and 25 with respect to the pin 28 would allow. This same type of deformation of the pin 28 occurs when the inner surfaces of the slip members 12, 13 and 14 have become worn beyond permissible limits. Similar deformation of the rod 28 occurs when wear on the outer surface of the slip members 12, 13 and 14 or on the inner surface of the master bushing bowl has become more than allowable or when the pipe 16 is oversize with consequent danger of pipe damage or slip assembly breakage. However, in the latter case the deformation of the pin 28 will be oppositely directed though similar in form and recognizable as due to some component being of nonacceptable size.

In case of misalignment or angular wear in the bowl 20 or on the outer surfaces of the slip members 12, 13 and 14 the lugs 22 are forced into angular misalignment with the lugs 24 as seen in FIG. 6 in which case a somewhat different deformation of the pin 28 results with indentations nearest the pin ends on opposite sides of the pin 28 as shown in FIG. 6. Testing with the gage rod 44 reveals that the pin 28 has been deformed and gives warning of conditions conducive to damage of the various elements involved in supporting the pipe 16 by use of the slip assembly 10, while the type of deformation indicates angular mismatching.

It is to be noted that the shouldered gage rod 44 will give two readings of the amount of deformation and, if the gage rod 44 is properly sized, deformation between these two limits will be excellent warning that size relationships exist which are marginal to safe operation so that corrective action can be initiated before any damage is done.

It is to be realized that a single diameter cylindrical rod having a diameter equal to that of the smaller portion 46 can be used to indicate a dangerous amount of mismatching and will still be far better than waiting for the appearance of damage to initiate corrective action.

Another embodiment of this invention provides a tubular pin of spring steel or other temporarily deformable material strong enough to hold the slip assembly in shape while being handled but deformable when under stress in suspending the pipe string to be used in place of at least one of the pins 28. Testing with the gage rod must be done while the slip assembly is in the bowl and the pipe string is suspended therefrom since the pin of this embodiment would spring back to a straight condition when the stress was removed.

It is further to be noted that a solid pin of soft steel, brass or bronze or any other substance of sufficient strength and yet permanently deformable can be substituted for the hollow pin 28. However, testing of the solid pin for deformation would be limited to rotation of the pin within the hinges to note displacement of the lugs 22 with respect to the lugs 24 during such rotation, or removing the solid pin from the assembly and rolling it on a flat surface to observe the amount and type of deformation.

A preferred embodiment of the structure of this invention having herein been described and illustrated it is to be realized that the principles of this invention can be embodied in other structures of similar function. It is therefore respectfully requested that this invention be interpreted as broadly as possible within the scope of the claims appended hereto.

What I claim is:

1. In a pipe slip assembly having a plurality of slip members with at least one hinge lug on each of said slip members, said hinge lugs having bores therein respectively, pairs of said bores being axially aligned when pairs of said hinge lugs are mated by positioning said slip members to form such a slip assembly, the improvement comprising: a normally rigid hinge pin extending through said aligned bores of a mated pair of said lugs, said hinge pin being readily and measurabbly deformable under load occurring when aligned bores are forced into misalignment exceeding a predetermined amount.

2. In a pipe slip assembly the improvement as specified in claim 1 wherein said hinge pin is an elongated cylindrical permanently defromable rod.

3. In a pipe slip assembly the improvement as specified in claim 1 wherein said hinge pin is tubular.

4. In a pipe slip assembly the improvement as specified in claim 3 wherein said hinge pin is permanently deformable.

5. A pipe slip assembly as specified in claim 4 wherein such a pipe slip assembly comprises three of said slip members and two of said hinge pins.

6. A pipe slip assembly as specified in claim 5 wherein there are two pairs of said hinge lugs on one of said slip members and one pair of said lugs on each of the other of said slip members respectively.

7. The method of testing a pipe slip assembly comprising the steps of: forming a pipe slip assembly by assembling a plurality of pipe slip members having hinge lugs having at least one elongated hinge pin received within aligned bores in an aligned pair of said hinge lugs; engaging said pipe slip assembly with an upper pipe member of a suspended pipe string; lowering said pipe string and said slip assembly into supporting means; suspending the weight of said pipe string on said slip assembly within said means; and determining excessive misalignment of said hinge lugs by the amount of deformation of said hinge pin.

8. The method of testing a pipe slip assembly as specified in claim 7 wherein said determination is effected by rotating said hinge pin within said aligned bores.

9. The method of testing a pipe slip assembly as specified in claim 7 wherein said determination is effected by removing said pin from said bores and rolling said pin on a flat plate to indicate said amount of deformation.

10. The method of testing a pipe slip assembly as specified in claim 7 wherein said hinge pin is hollow and said determination is effected by inserting a cylindrical gage rod into said hinge pin as far as possible.

11. The method of testing a pipe slip assembly as specified in claim 10 wherein said gage rod has a first elongated portion of one diameter and a second elongated portion of a smaller diameter and said determination includes differentiation between allowable deformation when less than 5% of said first portion is insertable in said pin and non-allowable deformation when less than 5% of said second portion is insertable in said pin.

References Cited

UNITED STATES PATENTS 2,245,979    6/1941    Johnson.

WILLIAM FELDMAN, *Primary Examiner.*

DONALD A. GRIFFIN, *Examiner.*